United States Patent
Cherubini et al.

(10) Patent No.: US 10,621,102 B2
(45) Date of Patent: Apr. 14, 2020

(54) MANAGING DIGITAL DATASETS ON A MULTI-TIERED STORAGE SYSTEM BASED ON PREDICTIVE CACHING

(71) Applicant: International Business Machines Corporation, Armonk, NY (US)

(72) Inventors: Giovanni Cherubini, Rueschlikon (CH); Yusik Kim, Zwolle (NL); Mark A. Lantz, Thalwil (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/467,423

(22) Filed: Mar. 23, 2017

(65) Prior Publication Data

US 2018/0276134 A1 Sep. 27, 2018

(51) Int. Cl.
| | |
|---|---|
| *G06F 12/0888* | (2016.01) |
| *G06N 7/00* | (2006.01) |
| *G06F 12/08* | (2016.01) |
| *G06F 12/0862* | (2016.01) |

(52) U.S. Cl.
CPC ......... *G06F 12/0888* (2013.01); *G06F 12/08* (2013.01); *G06F 12/0862* (2013.01); *G06N 7/005* (2013.01); *G06F 2212/1016* (2013.01); *G06F 2212/502* (2013.01); *G06F 2212/6026* (2013.01)

(58) Field of Classification Search
CPC .. G06F 12/0888; G06F 2212/60; G06N 7/005
See application file for complete search history.

(56) References Cited

U.S. PATENT DOCUMENTS

| | | | |
|---|---|---|---|
| 8,429,346 B1 * | 4/2013 | Chen | G06F 3/0613 709/213 |
| 8,566,483 B1 * | 10/2013 | Chen | G06F 3/0605 710/18 |
| 8,850,152 B2 * | 9/2014 | Watanabe | G06F 3/061 711/114 |
| 8,930,667 B2 | 1/2015 | Alatorre et al. | |
| 9,092,461 B1 | 7/2015 | Suldhal | |

(Continued)

OTHER PUBLICATIONS

Xiaohui Gu and Haixun Wang; Online Anomaly Prediction for Robust Cluster Systems; Apr. 10, 2009; IEEE ; pp. 1001-1006.*

(Continued)

*Primary Examiner* — Yaima Rigol
(74) *Attorney, Agent, or Firm* — Harrington & Smith

(57) ABSTRACT

A computer-implemented method is provided for managing digital datasets stored on a multi-tiered storage system that includes several tiers of storage, the datasets likely to be accessed by one or more applications interacting with the storage system. The method includes monitoring an access history of datasets accessed by the one or more applications; and while monitoring the access history: computing probabilities of access, by the one or more applications, of the datasets stored on the storage system according to metadata associated to given datasets as identified in the monitored access history; and based on the computed probabilities of access, selecting one or more of the datasets to be moved across the tiers. Related storage systems and computer program products are also provided.

14 Claims, 3 Drawing Sheets

(56) References Cited

U.S. PATENT DOCUMENTS

| | | | |
|---|---|---|---|
| 9,304,928 B2 | 4/2016 | Udayashankar et al. | |
| 9,372,793 B1 | 6/2016 | Derbeko et al. | |
| 9,424,187 B1 | 8/2016 | Todd et al. | |
| 2007/0239747 A1* | 10/2007 | Pepper | G06F 17/30864 |
| 2011/0010514 A1 | 1/2011 | Benhase et al. | |
| 2014/0095775 A1* | 4/2014 | Talagala | G06F 12/0866 |
| | | | 711/103 |
| 2014/0304309 A1* | 10/2014 | Diederich | H04L 67/1097 |
| | | | 707/812 |
| 2014/0372250 A1* | 12/2014 | Dugan | G06Q 30/0631 |
| | | | 705/26.7 |
| 2015/0039837 A1* | 2/2015 | Quan | G06F 3/061 |
| | | | 711/136 |
| 2015/0310031 A1* | 10/2015 | Kilpatrick | G06F 16/122 |
| | | | 707/748 |
| 2017/0075612 A1* | 3/2017 | Nukariya | G06F 3/0653 |
| 2018/0081541 A1* | 3/2018 | Uppal | G06F 3/061 |

OTHER PUBLICATIONS

R. Chen and K. Sivakumar; A New Algorithm for Learning Parameters of a Bayesian Network from Distributed Data; Mar. 10, 2003; IEEE ; pp. 586-588.*

Gregory Ditzler, Matthew Austen, Gail Rosen, and Rowan Polikar; Scaling a neyman-pearson subset selection approach via heuristics for mining massive data; Jan. 15, 2015; IEEE; pp. 3-6.*

Xindong Wu, Xingquan Zhu, Gong-Qing Wu and Wei Ding; Data Mining with Big Data; Jan. 2014; IEEE; pp. 101.*

Jen-Tzung Chien and Guo-Hong Liao; Transformation-Based Bayesian Predictive Classification Using Online Prior Evolution; May 2001; IEEE.*

I-Hsien Yin, Estevam R. Hruschka Jr and Heloisa de A. Camargo; Intelligent Classification System using a Pruned Bayes Fuzzy Rule Set; Feb. 4, 2011; IEEE.*

* cited by examiner

MANAGING DIGITAL DATASETS ON A MULTI-TIERED STORAGE SYSTEM BASED ON PREDICTIVE CACHING

BACKGROUND

The invention relates in general to computerized methods and systems for managing digital datasets stored on a multi-tiered storage system. In particular, it concerns predictive caching methods, wherein datasets that have high probabilities of access are prefetched, e.g., selected in order to be moved across tiers of the storage system.

Multi-tiered storage systems are known, which comprise several tiers of storage. Such systems typically assign different categories of data to various types of storage media, in order to reduce the global storage cost, while maintaining performance. A tiered storage system usually relies on policies that assign most frequently accessed data to high-performance storage tiers, whereas rarely accessed data are stored on low-performance (cheaper, and/or slower) storage tiers.

Consider for example a storage system wherein applications are run on large batches of datasets (e.g., astronomical data repositories, financial transaction logs, medical data repositories). Data that have not been accessed for long periods of time (also called "cold data") are stored on cheaper (energy efficient) media such as tapes. However, accessing data from such media is also slower and this implies a substantial drop in performance of applications running on data stored in these media.

Storage systems are known, which use data prefetching schemes, which may depend on the dataset access history. In such approaches, statistics of the accessed datasets allow the next accesses to be predicted, such that data prefetching is more effective. However, in big data systems with large amounts of cold data, statistics are often not available, at least not at a dataset level, such that no efficient prefetching can be performed.

SUMMARY

According to an example embodiment, a computer-implemented method is provided for managing digital datasets stored on a multi-tiered storage system that comprises several tiers of storage, the datasets likely to be accessed by one or more applications interacting with the storage system, the method comprising: monitoring an access history of datasets accessed by the one or more applications; and while monitoring the access history: computing probabilities of access, by the one or more applications, of the datasets stored on the storage system according to metadata associated to given datasets as identified in the monitored access history; and based on the computed probabilities of access, selecting one or more of the datasets to be moved across said tiers.

According to another example embodiment, a multi-tiered storage system is provided that comprises several tiers of storage and a management unit for managing digital datasets stored on the multi-tiered storage system, the datasets likely to be accessed by one or more applications interacting with the storage system, in operation, wherein the management unit is configured to: monitor an access history of datasets accessed by the one or more applications; and while monitoring the access history: compute probabilities of access, by the one or more applications, of the datasets stored on the storage system according to metadata associated to given datasets as identified in the monitored access history; and based on the computed probabilities of access, select one or more of the datasets to be moved across said tiers.

According to another example embodiment, a computer program product is provided for managing digital datasets stored on a multi-tiered storage system that comprises several tiers of storage, the datasets likely to be accessed by one or more applications interacting with the storage system, the computer program product comprising a computer readable storage medium having program instructions embodied therewith, the program instructions being executable by one or more processors to cause a dataset management unit of the storage system to: monitor an access history of datasets accessed by the one or more applications; and while monitoring the access history: compute probabilities of access, by the one or more applications, of the datasets stored on the storage system according to metadata associated to given datasets as identified in the monitored access history; and based on the computed probabilities of access, select one or more of the datasets to be moved across said tiers.

Systems, methods, and computer program products according to exemplary embodiment s will now be described, by way of non-limiting examples, and in reference to the accompanying drawings.

BRIEF DESCRIPTION OF SEVERAL VIEWS OF THE DRAWINGS

The accompanying drawings show simplified representations of systems and parts thereof, as involved in embodiments. Similar or functionally similar elements in the figures have been allocated the same numeral references, unless otherwise indicated.

DETAILED DESCRIPTION

Figure 1:
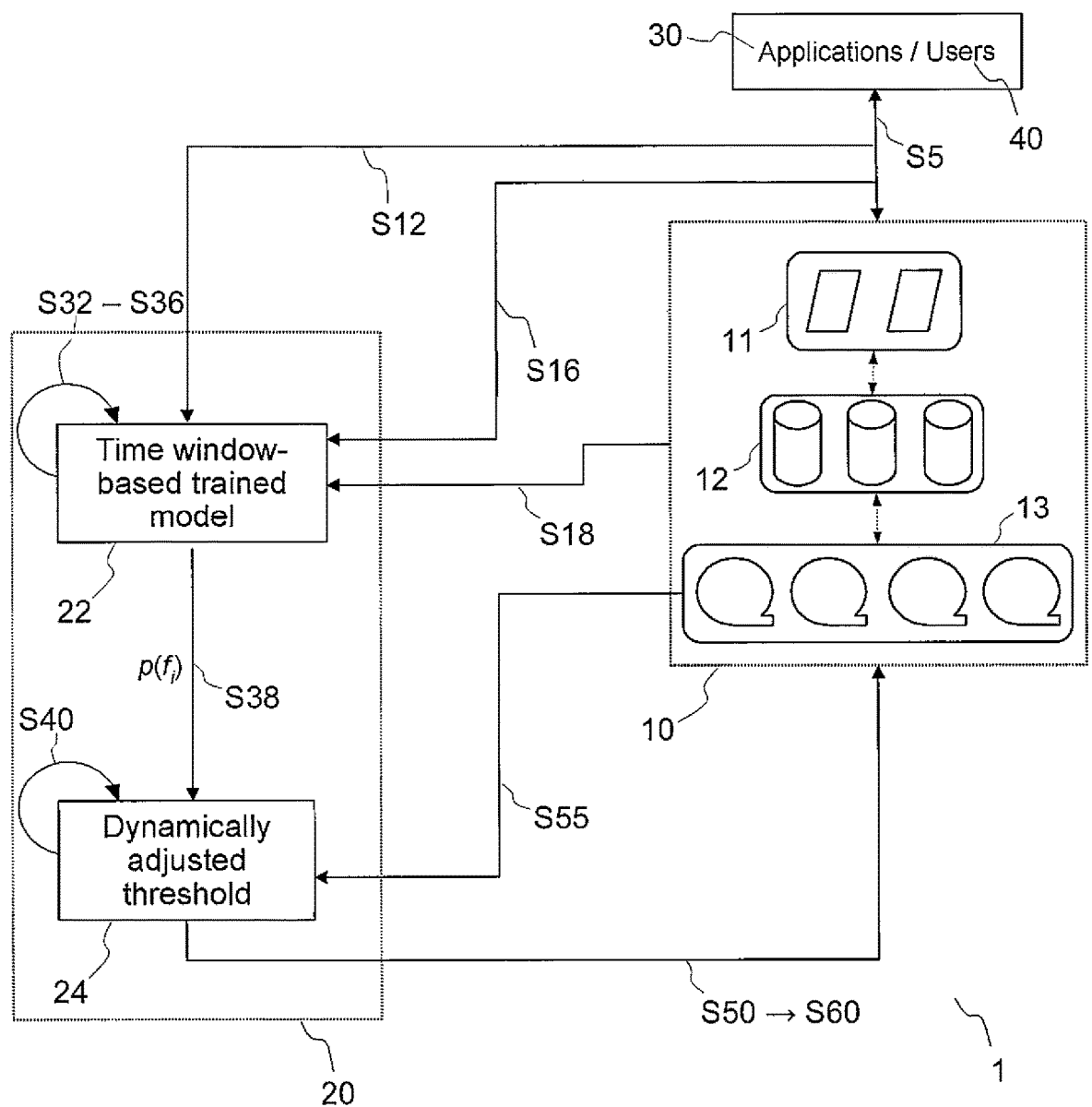
FIG. 1 is a block diagram schematically illustrating selected components of a storage system or interacting therewith, as involved in embodiments.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for managing digital datasets on a multi-tiered storage system based on predictive caching.

According to an exemplary embodiment, a computer-implemented method for managing digital datasets that are stored on a multi-tiered storage system. The system comprises several tiers of storage. The datasets are likely to be accessed by one or more applications interacting with the storage system. This method relies on monitoring an access history of datasets accessed by the one or more applications. While monitoring the access history, probabilities of access are computed, based on which one or more of the datasets are selected to be moved across said tiers. This selection can be regarded as a data prefetching process.

The access probabilities computed are probabilities of access, by the one or more applications, of the datasets stored on the storage system. Interestingly, the probabilities are computed according to metadata associated to given datasets as identified in the monitored access history. This makes it possible to improve the prefetching process in two respects. First, the present scheme makes it possible to dynamically adapt the prefetching process, as it takes into account, by construction, the tune-varying context in which applications access the datasets. Second, since this approach nevertheless relies on metadata associated to datasets observed in the monitored history (rather than the datasets themselves), relevant probabilities of access can subsequently be computed for datasets (e.g., files) stored on the system, to which similar metadata are associated.

In example embodiments, computing the probabilities of access comprises comparing metadata associated to datasets stored on the storage system to metadata associated to the given datasets as identified in the monitored access history. From this comparison, probabilities of access of the datasets stored on the storage system can be derived. This comparison leverages the fact that datasets that have metadata most similar to recently accessed datasets have a fair chance of being accessed in the near future, making them suited candidates for prefetching.

Preferably, this comparison comprises sampling metadata associated to datasets stored on the storage system, together with metadata associated to said given datasets in the monitored access history and occurrences of said given datasets in the monitored access history. Samples are accordingly obtained, based on which said probabilities of access can be computed.

In preferred embodiments, the comparison comprises estimating conditional probabilities $P(L=1|X=x, Y=y) \equiv p(1|x, y)$ of occurrences, in the access history, of metadata associated to datasets stored on the storage system, given metadata y associated to datasets stored on the storage system, and metadata x associated to said given datasets in the monitored access history, as sampled. The probabilities of access are computed based on the probabilities of occurrences estimated. Such conditional probabilities $p(1|x, y)$ of occurrences are preferably estimated according to Bayes law.

In embodiments, the above method further comprises reducing (e.g., in view of estimating the conditional probabilities $p(1|x, y)$), a dimensionality of arrays $\{x, y\}$ involved in such probabilities $p(1|x, y)$, so as for the latter to be computed as $p(1|z)$, wherein each value z corresponds to pairs of value. The obtained probabilities make them more readily compatible with a document classifier. Accordingly, the comparison step shall, preferably, further comprise training a classifier based on the estimated probabilities $p(1|z)$ of occurrences.

In preferred embodiments, monitoring the access history comprises identifying at least one time window in the access history. The time window comprises a tuple of said given datasets. The sampling is performed based on the at least one time window identified.

Preferably, the at least one time window identified is a time sliding window, wherein different tuples of said given datasets are identified over time. The method may, in that case, further comprise repeating the steps of computing the probabilities of access and selecting said one or more of the datasets, whereby probabilities of access of the datasets stored on the storage system are recomputed according to metadata associated to tuples of said given datasets that change over time. As the tuples of datasets identified in the time sliding window change over time, access probabilities are re-computed, e.g., to update them according to a latest temporal context.

Apart from the latest temporal context, various contexts may be taken into account. I.e., in embodiments, the monitoring the access history comprises identifying several time windows in the access history, each of the several time windows comprising a respective tuple of said given datasets. In that case, the step of sampling is based on the several time windows identified, so as to be able to learn about different contexts.

Yet, the probabilities of access are preferably computed based on a subset of said several time windows, said subset comprising most recent ones of the several time windows identified. E.g., only the most recent data are taken in consideration.

In preferred embodiments, the method further comprises dynamically updating one or more likelihood thresholds. During the selection process, one or more datasets are selected to be moved across the tiers, by comparing probabilities of access as computed for the datasets stored on the system with the dynamically updated one or more likelihood thresholds. Preferably, the likelihood thresholds are dynamically updated based on a Neyman-Pearson criterion.

In example embodiments, comparing the metadata further comprises weighting metadata associated to the given datasets (as identified in the monitored access history). For example, metadata associated to more recently accessed datasets are assigned a higher weight than metadata associated to less recently accessed datasets, to favor most recently accessed datasets in the selection process.

In preferred embodiments, the method further comprises moving the selected one or more of the datasets across the tiers, which is typically performed based on free space remaining on tiers of the storage system.

In example embodiments, the datasets are likely to be accessed by two or more applications interacting with the storage system. In that case, distinct probabilities of access can be computed for each of said two or more applications.

Similarly, example embodiments of the present methods may involve two or more applications owned by two or more users, in which case distinct probabilities of access may be computed for each of the two or more users.

According to another aspect, the invention is embodied as a multi-tiered storage system. The latter comprises several tiers of storage and a management unit for managing digital datasets stored on the storage system. As discussed earlier, the datasets are likely to be accessed by one or more applications interacting with the storage system, in operation. The management unit is configured to monitor an access history of the datasets accessed by the applications and, while monitoring this, compute probabilities of access and select datasets to be moved across said tiers, consistently with the present methods.

According to another aspect, a computer program product is provided for managing digital datasets stored on a multi-tiered storage system such as described above. The computer program product comprises a computer readable storage medium having program instructions embodied therewith, the program instructions executable by one or more processors to cause a dataset management unit of the storage system to take steps as described above.

The following description is structured as follows. First, general embodiments and high-level variants are described (sect. 1). The next sections address more specific embodiments and technical implementation details (sect. 2 and 3).

1. General Embodiments and High-Level Variants

Figure 2:
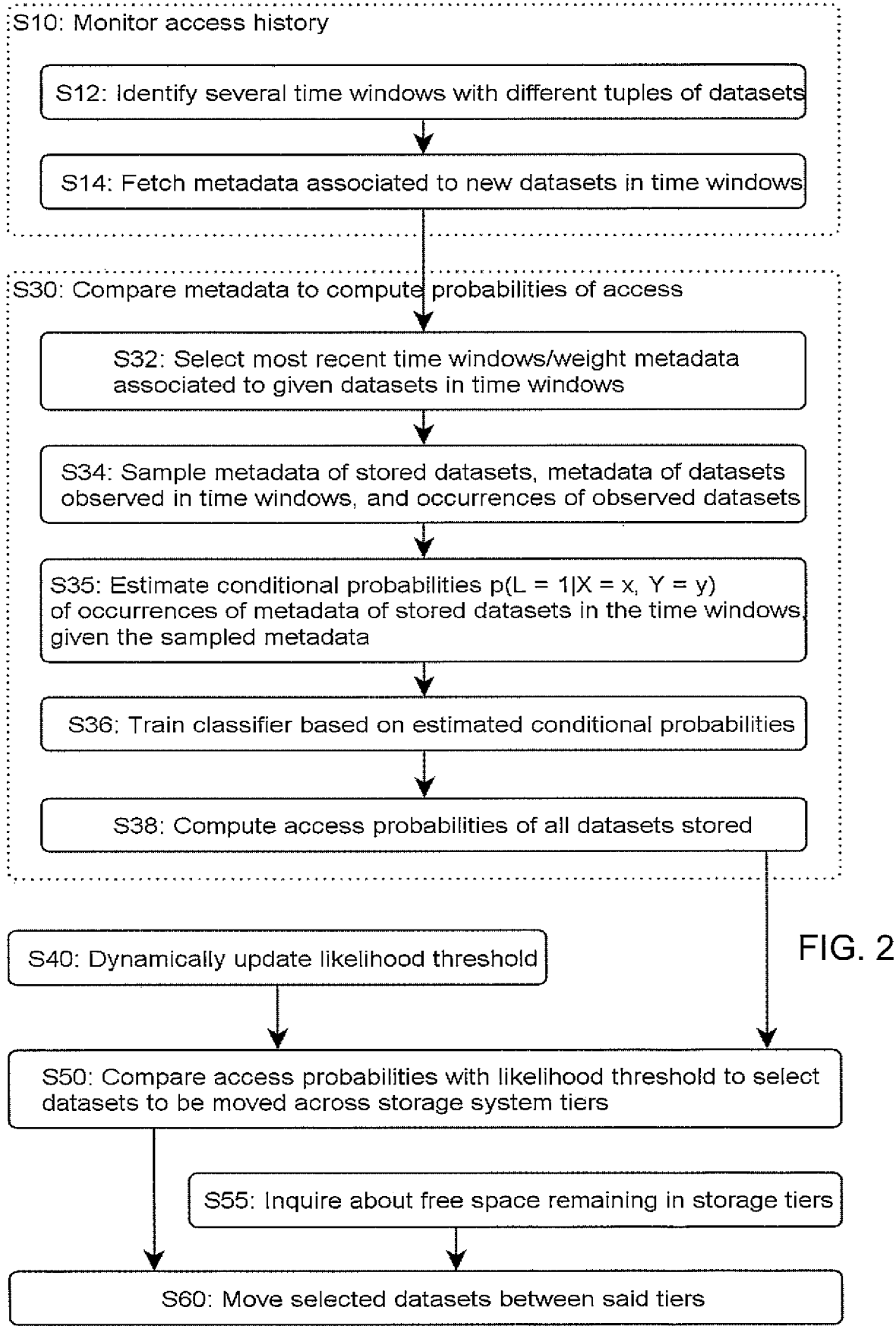
FIG. 2 is a flowchart illustrating high-level steps of a method for managing digital datasets stored on a multi-tiered storage system, according to embodiments.

In reference to FIGS. 1-2, an aspect of the invention is first described, which concerns computerized methods for managing digital datasets as stored on a multi-tiered storage system 10.

FIG. 1 shows a block diagram 1 including selected components of a storage system in accordance with example embodiments. This storage system 10 is assumed to comprise at least two tiers 11-13 of storage. A tiered storage system is known per se. A tier is typically defined as a homogenous collection of storage devices of a same kind, having all similar (if not identical) storage characteristics. Typically, the system 10 will involve three tiers of storage. For instance, the system 10 depicted in FIG. 1 involves SSD devices 11 (first tier), high-end disks 12 (second tier), and tape drives 13 (third tier). Yet, additional tiers could be involved, e.g., low-end disks could be used in an intermediate tier between tiers 12 and 13.

The datasets considered here can be any consistent set of data, whose granularity may range between, e.g., data blocks (i.e., physical records, having a given, maximum length) and files (i.e., collections of blocks or file fragments), or collections of files. More generally, it may be any sequence of bytes or bits, or file fragments, having a predefined format or length.

The datasets stored across the tiers are likely to be accessed by one or more applications 30 as the latter interact S5 with the storage system 10. By interacting with the system 10, applications 30 consume data as input, which input data need be fetched from the storage system 10, and also produce new data, which may need to be stored on the system 10.

Essentially, the present methods revolve around monitoring S10 an access history of datasets accessed S5 by the applications 30. While monitoring the access history, probabilities of access are computed, based on which one or more of the datasets are selected to be moved across said tiers. This selection can be regarded as a data prefetching process.

Interestingly, the probabilities of access (by one or more applications 30) of the datasets stored on the storage system 10 are here computed S30, S38 according to metadata associated to given datasets as identified in the monitored access history. Thus, the present methods do not merely rely on a list of accessed datasets but also involve metadata associated thereto. That is, the computation of the probabilities involves metadata associated to the datasets that are identified in the monitored access history, while monitoring S10 the latter. Accordingly, monitoring S10 may, e.g., include identifying S12 at least one time window, in the access history, monitoring metadata of datasets S16 associated with at least time window, and obtaining S18 metadata of stored datasets. This, as it can be realized, allows the prefetching process to be dynamically adapted, taking into account the time-varying context in which applications 30 access the datasets. Still, because the present approach nevertheless relies on metadata associated to observed datasets (rather than the datasets themselves), relevant probabilities of access can nevertheless be subsequently computed for datasets (e.g., files) stored on the system, e.g., to which similar metadata are associated.

Finally, one or more of the datasets may be selected S50 to be moved across the tiers 11-13, based on the computed probabilities of access. Thus, an effective prefetching scheme can be achieved, even if the system does not, per se, maintain statistics on the effectively accessed datasets. Indeed, the present approach can be applied on top of existing storage systems, e.g., big data systems that have limited or no access history associated with each dataset and, in particular, to systems where accesses to datasets are non-stationary.

Note that the present prefetching approach is not restricted to a mere association of access patterns to metadata of the stored datasets. Identifying access patterns can indeed be efficient, in some cases, e.g., where applications have well-defined beginning and end, during which the access statistics are stationary. Yet, when access statistics are non-stationary and/or when applications (e.g., a download/staging server) are continually running with no well-defined running period, identifying access patterns may become less effective. There, it becomes more effective to use as input the access history and metadata corresponding to datasets observed in this access history, as present inventors have realized.

Preferred embodiments of the present methods involve sliding windows and machine learning techniques are preferably used to select the datasets for prefetching, as discussed below in detail.

In embodiments, use is additionally made of metadata associated to datasets as stored on the system 10. Namely, the probabilities of access are computed S30, S38 by comparing S30 metadata associated to datasets stored on the storage system 10 with metadata associated to the observed datasets, i.e., the datasets as identified in the monitored access history. That is, metadata of the stored datasets are compared to metadata of the observed datasets, so as to be able to derive S38 probabilities of access for the datasets stored on the storage system 10.

Comparing the metadata should be understood in a broad sense: this comparison may involve any mathematical function or sequences of functions taking as input: (i) on the one hand, metadata associated to the stored datasets, for which access probabilities need be estimated; and (ii) on the other hand, the metadata associated to the sole datasets as identified in the monitored access history.

In other words, the metadata associated to the stored datasets are related, during the comparison step, to metadata associated to the observed datasets (e.g., the recently observed datasets), whereby relevant metadata can be obtained, as an indication of which datasets are more likely to be accessed next.

In simple embodiments, the observed metadata could be used in an inverted index, i.e., an index data structure that maps metadata to locations in the storage system, to quickly identify those datasets that are likely to be accessed in the future. However, in most sophisticated approaches, such as described below, metadata of the stored datasets are sampled, together with metadata associated to observed datasets (i.e., in the monitored access history), so as to be able to derive conditional probabilities of access, as discussed now in detail.

Indeed, the comparison step S30 may, in embodiments, comprise a sampling step S34, whereat three types of data are sampled, which are: (i) the metadata associated to the datasets stored on the storage system 10; together with (ii) observed metadata (associated to datasets observed in the access history) and (iii) occurrences of the observed datasets. The occurrences can be coded as simple labels, e.g., l=0 or 1, indicative of whether metadata occurred in the access history or not. The samples accordingly obtained can then be used to compute S30 the desired probabilities of access.

Comments are in order:

- Most generally, this sampling aims at correlating metadata with datasets that have occurred in the access history. I.e., it samples variables {L, X, Y}, where:
  - X represents observed datasets (e.g., a series of datasets), to which metadata are associated, so that X eventually denotes metadata as observed in the access history. Since X typically reflects metadata captured in one or more time windows (e.g., most recent window(s)), X can be regarded as an environment state variable, as discussed in detail in sect. 2;
  - Y represents metadata of the stored datasets; and
  - L denotes the (non-)access occurrence (also called label) of metadata associated to the stored datasets.
- The quantities L, X, Y as defined above are time dependent. E.g., for a file at time t, the access/non-access label can be denoted by L(t), its metadata by Y(t), and the environment state by X(t);
- In a brute force sampling (not the preferred embodiment), the maximal dimension of X corresponds to the number of datasets observed in the access history (which can have doubloons, the datasets need not be distinct);
- In more sophisticated approaches, aiming to take into account a given context, X may relate to a given series of datasets, i.e., the dimension of X is set to a given number, the series corresponding to a given time window, involving a number of tuples of datasets, from which a model can be trained, for it to learn about that given context.
- Several series of datasets can even be considered to train the model, for it to learn about different contexts, whereby different values of X relate to distinct series of datasets, i.e., distinct time windows, which likely relate to different tuples of datasets, from which a model can be trained, for it to learn about the different contexts that correspond to the different tuples of datasets;
- In even more sophisticated approaches, although several contexts might have been used to train the model, the access probabilities can nevertheless be computed based on the most recent time window, so as to, e.g., favor a recent temporal context. This can be regarded as considering a sliding window, sliding over distinct time windows.

All this is now explained in detail. To start with, the comparison step S30 may, in embodiments, comprise estimating S35 conditional probabilities P(L=1|X=x, Y=y), also noted p(1|x, y). Note that uppercase letters denote, each, a random variable, whose realization is represented by the corresponding lowercase letter. E.g., x is a realization of the random variable X. As usual in the present field, the probability P(X=x) is often represented using the shorthand notation p(x). All random variables involved here are discrete, so p(x) denotes a probability mass function of X. Probabilities P(L=1|X=x, Y=y)≡p(1|x, y) are probabilities of occurrences, in the access history, of metadata associated to datasets stored on the storage system 10, given metadata y (associated to the stored datasets) and metadata x (associated to observed datasets), as sampled at step S34. Such probabilities of occurrences can in fact be regarded as probabilities of future occurrences, relative to a given time point, for reasons that will become apparent later. The probabilities of access are later computed S38 based on such probabilities of occurrences.

For example, said conditional probabilities p(1|x, y) of occurrences can be estimated according to Bayes law, i.e., P(L=1|X=x, Y=y)≡p(1|x, y)=p(x, y|1) p(1)/p(x, y). In variants, one may rely on a mere logistic regression, for example. As the one skilled in the art will appreciate, there are many other ways to estimate the desired probabilities of occurrences, given metadata sampled at step S34.

Advantageously, the dimensionality of arrays {x, y} as involved in the computation of probabilities p(1|x, y) is preferably reduced, to flatten out nested lists arising from the data structure {x, y}. This reduction can for instance be performed right after sampling S34, so that p(1|x, y) can be computed, at step S35, as an object that can formally be written and stored as p(1|z), wherein each value z nevertheless corresponds to pairs of value (x, y). I.e., a "word pair" model is accordingly obtained (not to be confused with a bigram approach as used in bag-of-words models), wherein the rule to construct a word pair is $z=\{x, y\}=\{(x_1, \ldots, x_n), y\}=\{(x_1, y), \ldots, (x_n, y)\}$. So, z corresponds to pairs of values.

Note that z can be a set of pairs $(x_i, y)$ of values, wherein each $x_i$ corresponds to a respective series of datasets, e.g., a respective time window, in which several datasets are identified. However, z may restrict to only one pair $(x_1, y)$ (x, y) of values. In all cases yet, at least one series of observed datasets shall be taken into account, for sampling the data at step S34, as evoked earlier.

We note that, even if the dimensionality of arrays {x, y} is reduced, the cardinality of {x, y} need, however, not be reduced (and it is preferably not). As one may realize, handling objects in the form p(1|z) makes it more readily compatible with a document classifier.

Therefore, the comparison step S30 may, in embodiments, further comprise training S36 a classifier and, this, based on the estimated probabilities p(1|z). One may for instance use a naïve Bayes classifier, which can efficiently be trained in a supervised learning setting. There, the naive conditional independence assumptions allows the probability p(1|z) to be rewritten as a product of probabilities, which, in turn, allows a posterior distribution to be formulated and used for classification, as explained in detail in sect. 2.

At present, the use of time windows is explained in more detail. In embodiments, the monitoring S10 of the access history comprises identifying S12 at least one time window, in the access history. As evoked earlier, a time window comprises a tuple of given datasets. The sampling step S34 will therefore be performed based on the at least one time window identified.

A time window is typically limited to a given, maximal number of datasets (e.g., a maximum of 20 000 datasets are monitored, to limit computational costs). The tuple may for instance be a truncated access history, i.e., defined by the window boundaries, wherein a predefined, maximal number of datasets will be identified. Still, elements identified in a time window need not be distinct. A same dataset can appear multiple times in a same time window if this dataset is accessed S5 multiple times by one or more applications 30 within that time window.

As it may be realized, the sequential order of the elements appearing in a time window also carries information, which may potentially be used (e.g., more recently accessed datasets may be more relevant and thus accordingly weighted, as discussed later in detail).

As said earlier, one or more time windows may be relied on. If only one time window is used, then the latter is preferably a sliding window, such that the tuples of datasets identified therein change over time. And this may, in turn, give rise to: re-computing access probabilities, to update them according to a latest context; and accordingly updating the selection of datasets for prefetching, as explained below.

In a time sliding window, different tuples of datasets get identified over time. In that case, the steps of computing S38 the probabilities of access and selecting S50 the datasets are repeated, according to the changing tuples. That is, the probabilities of access of the datasets stored on the storage system 10 are dynamically updated (recomputed) according to metadata associated to the tuples of datasets, which evolves in time (new metadata associated to newly observed datasets modify a current pool of metadata, leading to updated probabilities).

For example, upon identifying a new dataset occurring in the sliding window, metadata associated to the new dataset identified may be fetched S14, which will modify a current set of metadata and accordingly trigger a re-computation S38 of the access probabilities. Yet, the probabilities need not necessarily be recomputed each time a new event is identified in the sliding window. Rather, the probabilities may be refreshed at a fixed, predetermined rate (though, typically, the latter can be changed, e.g., adaptively modified).

Still, recomputing access probabilities is only necessary for dynamically updated models. In variants, different contexts may be captured by different time windows, which are then used to train a model, as explained now.

In such embodiments, the monitoring S10 comprises identifying S12 several time windows in the access history. These windows are centered on distinct time points. I.e., each of the time windows identified therefore comprises a respective (distinct) tuple of datasets. As such time windows are centered on different time points, they correspond to different time-local activity contexts. The sampling step S34 will thus be based on the several time windows identified S12, which allows different contexts to be taken into account for the model 22 subsequently trained S36.

The probabilities of access may subsequently be computed S38 based on all of the time windows used to train the model 22. In that case, the training of the model 22, may be static, i.e., it uses a fixed set of time windows, which allows offline training (in which case steps S32-S36 are a one-time process).

However, oldest associations may no longer be relevant to a current time context. Thus, the training of the model 22 may advantageously be dynamically updated with newly observed time windows, as evoked above. The newly observed time windows may simply be used to refine the model 22. However, the computation of access probabilities may be based on a subset S32 of the time windows used to train the model. For example, this subset may restrict to, e.g., a most recent one (or more) of the windows initially used S12, as assumed in FIG. 2. In that case, although different contexts are initially retained S12, only the most recent accesses are effectively used for the computation S38 of probabilities.

In a more sophisticated approach, a meta time window (typically extending over a few months) can be used to dynamically determine which time windows (as initially used to train the model 22) to use for obtaining a model usable at a given prediction time.

More generally, any weighting scheme can be contemplated. I.e., step S30 may comprise weighting S32 metadata associated to given datasets as identified in the monitored access history. For example, metadata associated to more recently accessed datasets are assigned S32 a higher weight than metadata associated to less recently accessed datasets.

In practice, a single time window typically corresponding to a few days, so as to capture a time-local activity context (e.g., tax returns, music listening, working on a given project, etc.). Still, as one may want learn a variety of associations between contexts and resulting access behavior of datasets, several time windows are preferably used as inputs for training the model 22. On the other hand, too many windows may be detrimental, due to computational reasons, or, perhaps more importantly, due to the fact that oldest associations may no longer be relevant to a current time context, whence the benefit of dynamically updating the model with newly observed time windows.

Based on the computed access probabilities, one or more of the datasets are selected (or prefetched) S50 to be moved across the tiers 11-13. This selection is typically performed by comparing S50 the computed access probabilities with one or more likelihood thresholds (e.g., distinct likelihood thresholds may be used for the tiers 11-13).

A likelihood threshold may be regarded as a threshold probability. In embodiments, the likelihood thresholds are dynamically updated S40 as shown at block 24. Thus, when selecting S50 datasets to be moved across the tiers 11-13, the computed access probabilities are compared S50 with dynamically updated 540 likelihood thresholds. This can notably be achieved based on a Neyman-Pearson criterion, as discussed in sect. 2.3. In variants, a maximum a posteriori (or MAP) criterion may be used. A Neyman-Pearson approach is nevertheless preferred as it offers better control on the level of tolerance for erroneous predictions. In that case, and as an example, when the likelihood of access computed for a given dataset in an intermediate tier 12 exceeds a likelihood threshold as just refined for that tier 12, then this dataset, is prefetched for relocation in a faster tier 11.

The above steps S10-S50 shall typically be performed by a management unit, or controller 20, which closely interact with the storage system 10. In practice, steps S10-S50 typically result in moving S60 selected datasets across the tiers 11-13. In general, the data as stored on an initial tier, which are then moved at step S60, need not necessarily be removed from the initial tier. For example, data that become frequently accessed may temporarily be duplicated on a fast tier 11, without it being necessary to delete the initial version as stored on the initial tier. However, the data moved may instead be relocated from one of the tiers 11-13 to another and be deleted from the initial tier, for the sake of optimization. In that respect, step S60 shall typically be performed based S55 on free space remaining on tiers 11-13 of the storage system 10. E.g., the management unit 20 may receive updates as to the free space remaining on tiers 11-13, based on which decision is made to move datasets across the tiers, or not.

In embodiments where several applications 30 interact with the storage system 10, it may be advantageous to compute distinct sets of access probabilities for each of these applications 30. Similarly, where such applications 30 are owned by different clients/users 40, the unit 20 may be configured to provide distinct probabilities of access for each of the users 40. To that aim, the access history may be split on a per-application or per-user basis, such that the subsequent predictions and computations S30 may be made on a corresponding basis. I.e., all the embodiments previously described can be readily adapted to obtain the desired per-application or per-user access prediction.

In embodiments, in order to obtain per-application or per-user access predictions, datasets having maximum likelihood of access that exceeds a likelihood threshold are selected to be moved to higher storage tiers. One may for example select the union of datasets selected at step S50 for each user/application. In this case, the threshold will preferably be such that the union of the selected datasets is not too large. In more sophisticated approaches, one may average the per-user probabilities of each dataset, to obtain a single probability.

According to another aspect, a multi-tiered storage system 10 is provided, such as depicted in FIG. 1. As discussed earlier, the storage system 10 comprises several tiers 11-13 of storage. A management unit 20 interacts closely with the storage system 10, so as to be able to implement steps S10-S55, as discussed above. Thus, the management unit 20 can effectively be considered to be part of this system 10, notwithstanding the depiction of FIG. 1. The datasets are likely to be accessed by applications/users 30, 40 interacting with the system 10, in operation.

The management unit is suitably configured so as to monitor the access history, (instruct to) compute access probabilities and select datasets for prefetching. A typical computerized unit 101, which may be configured to implement all the functions of the management unit 20, is described in detail in sect. 3.

Figure 3:
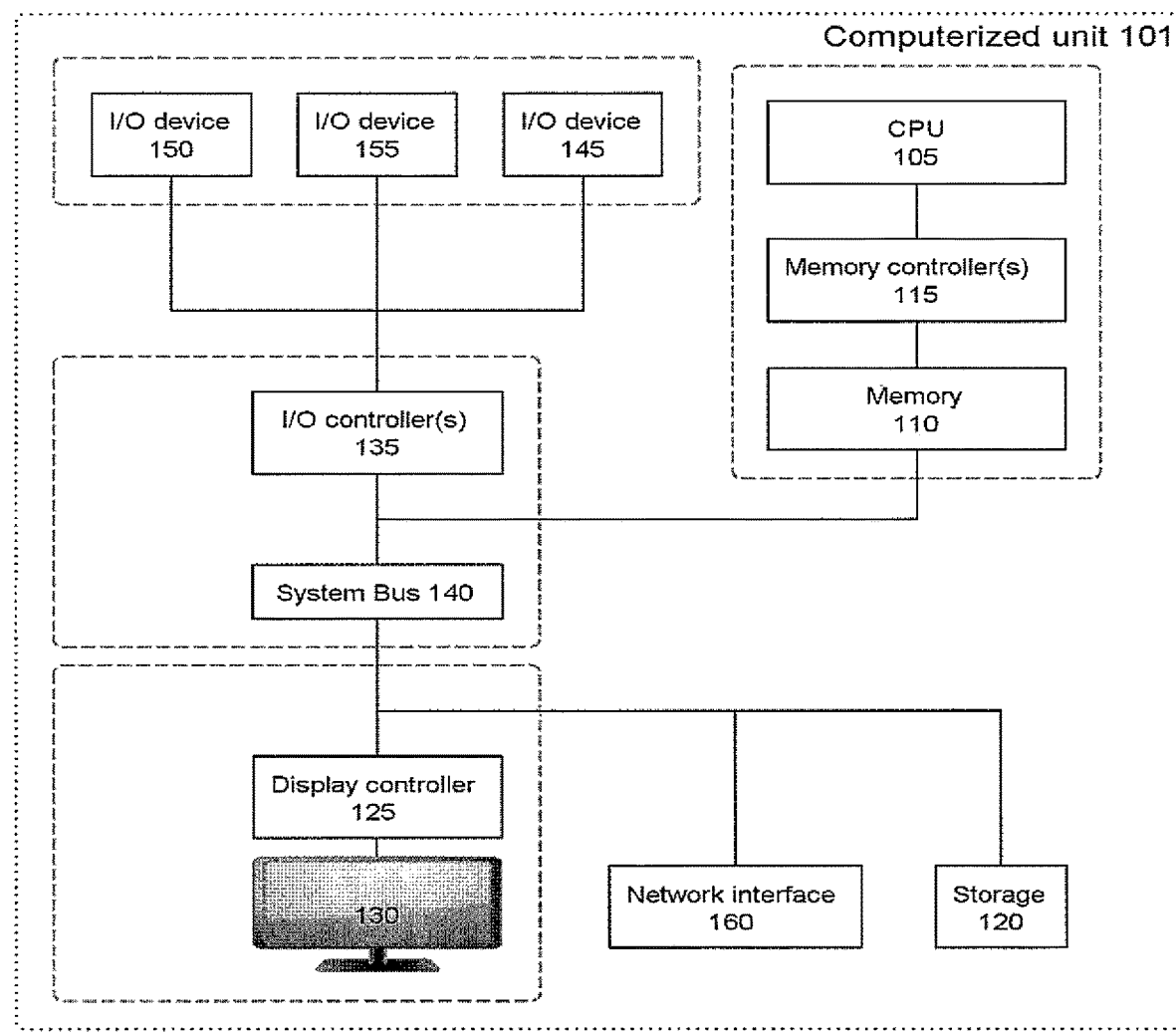
FIG. 3 schematically represents a general purpose computerized system, suited for implementing one or more method steps as involved in embodiments of the invention.

Next, according to a final aspect, the invention can also be embodied as a computer program product. The latter will typically be a computer readable storage medium having program instructions embodied therewith, which instructions are executable by one or more processors, e.g., of a unit 101 such as depicted in FIG. 3, to implement functions of management unit 20 as described above. Further details are given in sect. 3.

The above embodiments have been succinctly described in reference to the accompanying drawings and may accommodate a number of variants. Several combinations of the above features may be contemplated. Examples are given in the next section.

2. Specific Embodiments

Detailed embodiments are described below, for which some terminology and notations need be introduced.
2.1 Terminology and Notation
2.1.1 Datasets and Files For illustration purposes, datasets are here assumed to correspond to files, without prejudice as to the meaning of datasets as defined in sect. 1.
2.1.2 Random Variables and their Distributions A random variable is represented by an uppercase letter and its realization is represented by the corresponding lowercase letter, e.g., x is a realization of the random variable X. As indicated earlier, the probability $P(X=x)$ is represented using the shorthand notation $p(x)$; it is the probability mass function of X.
2.1.3 Prediction Time Period The prediction time period $T_P$ around time t is composed of a "look-back" period $[t-\delta_b, t)$, a "look-ahead" period $(t, t+\delta_a]$, and a prediction epoch t. The look-back period specifies the length of access history deemed appropriate for representing the activity context at time t. The look-ahead period specifies the near-future for which we are interested in predicting file access.
2.1.4 Metadata of a File The metadata of a file is represented by a K-tuple, where K is the number of metadata fields. Field k of metadata x is extracted using the notation $x^{(k)}$. Metadata corresponding to a collection of files are indexed using the subscript i, e.g., $x_i^{(k)}$; i=1, 2, . . . .

2.2 State-Space Model for Access Prediction

It is assumed that the access/non-access label of a file depends on its metadata values and a current state of the environment. The environment state provides the context in which a file with a certain metadata fingerprint is accessed or not. In general, this environment state may be a function of any observable, including the time where the label of file is determined. According to embodiments of the present invention, this environment state involve metadata and the monitored access history is assumed to aggregate metadata values of accessed files. Thus, the present approaches involve state definitions that are functions of a sequence of metadata values extracted from file access traces. Still, the environment state may use more sophisticated definitions. Further specification of the state definition remains a modeling decision which may reflect, among other things, how far back to the past should be considered relevant history for representing the context.

For a file at time t, its access/non-access label is denoted by L(t), while Y(t) corresponds to its metadata and X(t) is the current environment state (henceforth "state"). The label L(t) of a file at time t is determined by whether it is eventually accessed at least once before time $t+\delta_a$, where is a predefined look-ahead window representing the near future, e.g., the next 5 days, for which access need be predicted. When predicting the value of the label L(t) of a file at time t, X(t) and Y (t) are observed. So the posterior distribution of L(t) having observed X(t), Y(t), can be written as:

$$P(L(t)=l|X(t)=x, Y(t)=y), \quad (1)$$

which is the basis used for building a classifier.

It is henceforth assumed that the joint stochastic process (L(t), X(t), Y(t)) is stationary, which implies that the joint distribution at arbitrary epochs are independent and identically distributed (i.i.d.), thus we can omit the dependence on t.

In the following, several alternatives for modeling the posterior distribution are discussed, each with different state definitions and/or conditional independence assumptions. We do not make any parametric distributional assumptions in any of these alternatives but assume that each metadata field k takes values from a finite and discrete set $S_k$. However, this need not be the case in general and depending on the metadata fields, there may be cases where using a parametric distribution is more appropriate.
2.2.1 Most Recent Value Model A first model that may be used is called "Most Recent Value" (MRV) model, in which the state is defined as the most recent metadata, x, observed in the look-back period of the current $T_P$. The realized state x is a K-tuple, where K is the number of metadata fields:

$$x=(x^{(1)}, x^{(2)}, \ldots, x^{(K)}). \quad (2)$$

Similarly, the metadata y of a file for which we want to predict access can be expanded as:

$$y=(y^{(1)}, y^{(2)}, \ldots, y^{(K)}). \quad (3)$$

Note that the size of the state space is $$\Pi_{k=1}^{K} |S_k|, \quad (4)$$

which grows exponentially with respect to K. To limit the state space size, we assume that metadata fields are mutually independent conditioned on the label of the file so that inference of the likelihood can be done independently per field with state space size limited to $|S_k|$. The resulting likelihood function is $$p(x, y \mid l) = p((x^{(1)}, y^{(1)}), \ldots, (x^{(K)}, y^{(K)}) \mid l) \quad (5)$$

$$= \Pi_{k=1}^{K} p(x^{(k)}, y^{(k)} \mid l). \quad (6)$$

The probabilities $p(x^{(k)}, y^{(k)} \mid l)$ are estimated by counting the observation frequency of a sampling process, which may be performed as follows. For each time t:
a. Observe the current state x;
b. Sample N files from the file population stored on the storage system;
c. For each metadata field k of each sampled file:
 i. Observe the label l;
 ii. Observe its metadata value $y^{(k)}$; and
 iii. Create data point (l, $x^{(k)}$, $y^{(k)}$).

From the resulting data set, the K histograms of (L, X, Y) are constructed. Care is preferably taken to avoid getting a biased estimate of the marginal distribution of L from the generated data points. The count of L=l may be amplified or suppressed depending on the differing number of file samples N at each time t. Therefore, if N is allowed to vary for different times t and is correlated to L, the marginal distribution of L should preferably not be estimated from the generated data points. Instead, it may be estimated separately using the same number of file samples at each time t.

To predict the label of a file with metadata y under state x, the posterior probabilities of each label can be computed using the readily available table of estimated likelihood values:

$$p(l \mid x, y) \propto p(l) \Pi_{k=1}^{K} p(x^{(k)}, y^{(k)} \mid l). \quad (7)$$

2.2.2 Word Pair Model

In the word pair model, introduced in sect. 1: for metadata field k at a given prediction time period $T_P$, we consider the sequence of files accessed during the look-back period and their associated metadata. The resulting sequence $x_1^{(k)}, \ldots, x_M^{(k)}$ of metadata of accessed files is interpreted as M samples of the state, where M is the number of file accesses during the look-back period. Then, for each file sampled for training, each of the M sampled states is paired with the file's metadata to form M metadata word pairs $(x_i^{(k)}, y^{(k)})$; i=1, . . . , M and labeled according to access/non-access during the look-ahead period. This set of M word pairs can be considered as a document of word pairs representing the file and the problem of labeling a file is transformed to an instance of labeling a document.

When predicting the label of a given file, the set of word pairs describing the file is observed. The likelihood function is:

$$\Lambda(l) = \Pi_{k=1}^{K} p((x_1^{(k)}, y^{(k)}), \ldots, (x_M^{(k)}, y^{(k)}) \mid l). \quad (8)$$

Ignoring the order of $x_i$'s, we may treat the sequence of word pairs as a bag-of-words and make the naive Bayes assumption to factor the conditional probability, resulting in:

$$\Lambda(l) = \Pi_{k=1}^{K} \Pi_{i=1}^{M} p(x_i^{(k)}, y^{(k)} \mid l), \quad (9)$$

and finally the posterior distribution used for classification can be taken as:

$$p(l \mid x_1, y), \ldots, (x_M, y)) \propto p(l) \Pi_{k=1}^{K} \Pi_{i=1}^{M} p(x_i^{(k)}, y^{(k)} \mid l). \quad (10)$$

It can be seen from the similarity with the posterior of the MRV model (7) that the word pair model can be considered a generalization of the MRV model, wherein, instead of sampling one state per time t using the most recent value, it samples M states using the M recent values.

Observe that an estimate of the probabilities $p(x^{(k)}, y^{(k)} \mid l)$ is required to compute the posterior, which is done through empirical counts. The sampling process from which we get the counts is as follows. For each time t:
1. Observe M samples of the current state: $\{x_1, \ldots, x_M\}$;
2. Sample N files from the file population;
3. For each metadata field k of each sampled file:
 i. Observe the label l;
 ii. Observe its metadata value $y^{(k)}$; and
 iii. Create data points (l, $x_i^{(k)}$, $y^{(k)}$; i=1, . . . , M.

Like the MRV model, estimating the marginal distribution of L from the generated data points will generally result in a biased estimate, so it should preferably be done separately.

2.2.3 Other Variants

Other variants can be contemplated. For example, a conditional bag-of-words model may be devised, which uses the same sampling process to generate the data points as the word pair model but considers a different state definition and posterior distribution. The posterior distribution of the word pair model (10) assumes that: the word pairs $(x_1^{(k)}, y^{(k)}), \ldots, (x_M^{(k)}, y^{(k)})$ are observed; and, under the naive Bayes assumption, these are independent given the label.

However, if $y^{(k)}$ is observed once per sampled file and shared among the word pairs generated with it, as seen by all word pairs sharing $y^{(k)}$ instead of having different $y_i^{(k)}$, one might put into question the fact it is treated like it is resampled for each word pair when computing the likelihood. There is some structure in how the word pairs are constructed that its posterior distribution is indeed ignoring.

To address this issue, we may define the state to be the bag-of-words collection of the metadata of the M recently accessed files:

$$X = (X_1, \ldots, X_M). \quad (11)$$

From there, a posterior distribution $p(l \mid x_1, \ldots, x_M, y)$ can be derived, which is more faithful to the sampling process, inasmuch it appropriately reflects the fact that y is observed only once per sampled file.

Doing so, and assuming that the $x_i$ are independent given the label l and metadata value y of the file in question, a likelihood function can be formulated, from which a posterior distribution can be obtained as:

$$p(l \mid x_1, \ldots, x_M, y) \propto p(l) \Pi_{k=1}^{K} p(y^{(k)} \mid l) \Pi_{i=1}^{M} p(x_i^{(k)} \mid l, y^{(k)}). \quad (12)$$

Observe that the posterior of the word pair model (10) can be rewritten as follows:

$$p(l \mid x_1, y), \ldots, (x_M, y)) \propto p(l) \Pi_{k=1}^{K} [p(y^{(k)} \mid l)]^{\Pi_{i=1}^{M} p(x_x^{(k)} \mid l, y^{(k)})}. \quad (13)$$

The difference between the two posterior probabilities is that $p(y^{(k)} \mid l)$ is raised to the $M^{th}$ power in the word pair model (10). This means that relatively more emphasis is put on the static relation between a file's metadata and label ($p(y^{(k)} \mid l)$) than the part providing the context ($\Pi_{i=1}^{M} p(x_i^{(k)} \mid l, y^{(k)})$) compared to the conditional bag-of-words model. Also, it is clear that the two are equivalent when M=1, which coincides with the MRV model.

As the one skilled in the art may appreciate, other variants can be devised.

2.2.4 Note on the Empirical Joint Probability Distribution

It could be of concern that certain events that will never occur, e.g., a bag-of-words that contains two pairs $(x_i, x_j)$ and $(x_i, x_j)$, can have non-zero probabilities according to the empirical joint probability distribution. Notwithstanding the legitimacy of this concern, this is something that is also shared by the analogous document classification problem in which naive Bayes is used. Despite this, naive Bayes has been shown to be a good classifier in many document classification problems.

2.3 Decision Threshold for Prefetching Files

A rule that may be used for deciding whether to prefetch a file, in any of the embodiments described above is the so-called maximum a posteriori (MAP) criterion, which minimizes the misclassification probability. This, however, lacks a mechanism to control the level of tolerance for false alarms. To dynamically refine the threshold on the probability of access, which is used for selecting a file for prefetching, the Neyman-Pearson approach is therefore preferably used.

3. Technical Implementation Details

3.1 Computerized Units

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 10 and/or the unit 20 depicted in FIG. 1 may, each, involve one or more computerized units 101, such as schematically depicted in FIG. 3, e.g., general-purpose computers. In exemplary embodiments, in terms of hardware architecture, as shown in FIG. 3, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. A system bus 140 may connect the various components shown in FIG. 3. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods described herein in accordance with exemplary embodiments and a suitable operating system (OS). The OS essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices. In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network (not shown) and thereby interact with other, similar units 101, making up a system such as depicted in FIG. 1.

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS, in whole or in part are read by the processor 105, typically buffered within the processor 105, and then executed. When the methods described herein are implemented in software, the methods can be stored on any computer readable medium, such as storage 120, for use by or in connection with any computer related system or method.

3.2 Computer Program Products

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A computer-implemented method for managing digital datasets stored on a multi-tiered storage system that comprises several tiers of storage, the datasets likely to be accessed by one or more applications interacting with the storage system, the method comprising:

monitoring an access history of the datasets accessed by the one or more applications, where the monitoring comprises identifying metadata associated to the accessed datasets; and while monitoring the access history:

computing probabilities of access, by the one or more applications, of the datasets stored on the storage system by at least comparing metadata associated to the datasets stored on the storage system to the identified metadata associated to the accessed datasets as identified in the monitored access history, wherein the comparing of the metadata comprises weighting the identified metadata associated to the accessed datasets as identified in the monitored access history, wherein the identified metadata associated to more recently accessed datasets are assigned a higher weight than the identified metadata associated to less recently accessed datasets, where the comparing comprises use of the metadata associated to the datasets and not the datasets themselves;

wherein the comparing comprises sampling metadata associated to the datasets stored on the storage system, together with the identified metadata associated to said accessed datasets in the monitored access history and occurrences of said accessed datasets in the monitored access history, to obtain samples, and wherein said probabilities of access are computed based on the samples obtained;

wherein the comparing further comprises: estimating conditional probabilities $P(L=1|X=x, Y=y)=p(1|x, y)$ of occurrences, in the access history, of the metadata associated to datasets stored on the storage system, given metadata y associated to the datasets stored on the storage system, and metadata x associated to said accessed datasets in the monitored access history, as sampled, and wherein said probabilities of access are computed based on the probabilities of occurrences estimated;

reducing a dimensionality of arrays $\{x, y\}$ involved in said probabilities of occurrences $p(1|x, y)$, so as for the latter to be computed as $p(1|z)$, wherein each value z corresponds to pairs of value; and based on the computed probabilities of access, selecting and moving one or more of the datasets across said tiers.

2. The method according to claim 1, wherein said conditional probabilities of occurrences are estimated according to Bayes law.

3. The method according to claim 1, wherein the comparing further comprises training a classifier based on the estimated probabilities $p(1|z)$ of occurrences.

4. The method according to claim 1, wherein the monitoring of the access history comprises identifying at least one time window in the access history, the time window comprising a tuple of said accessed datasets, and wherein said sampling is performed based on the at least one time window identified.

5. The method according to claim 4, wherein the at least one time window identified is a time sliding window, wherein different tuples of said accessed datasets are identified over time, the method further comprising: repeating the steps of computing the probabilities of access and selecting said one or more of the datasets, whereby probabilities of access of the datasets stored on the storage system are recomputed according to metadata associated to tuples of said given datasets that change over time.

6. The method according to claim 4, wherein the monitoring of the access history comprises identifying several time windows in the access history, each of the several time windows comprising a respective tuple of said given datasets, and wherein said sampling is based on the several time windows identified.

7. The method according to claim 6, wherein said probabilities of access are computed based on a subset of said several time windows, said subset comprising most recent ones of the several sliding windows identified.

8. The method according to claim 1, wherein the method further comprises: dynamically updating one or more likelihood thresholds, and, at selecting, one or more of the datasets are selected to be moved across said tiers, by comparing probabilities of access as computed for the datasets stored on the system with the dynamically updated one or more likelihood thresholds.

9. The method according to claim 8, wherein the one or more likelihood thresholds are dynamically updated based on a Neyman-Pearson criterion.

10. The method according to claim 1, wherein the datasets are likely to be accessed by two or more applications interacting with the storage system and distinct probabilities of access are computed for each of said two or more applications.

11. The method according to claim 1, wherein the datasets are likely to be accessed by two or more applications interacting with the storage system, the two or more applications owned by two or more users, and wherein distinct probabilities of access are computed for each of said two or more users.

12. A multi-tiered storage system for managing digital datasets stored on the multi-tiered storage system, the datasets likely to be accessed by one or more applications interacting with the storage system, in operation, the multi-tiered storage system comprising:

one or more processors;

one or more non-transitory memories having computer-readable code stored thereon, wherein the one or more processors and the one or more non-transitory memories are configured in response to execution of the computer-readable code to cause the multi-tiered storage system to perform operations comprising:

monitoring an access history of the datasets accessed by the one or more applications, where the monitoring comprises identifying metadata associated to the accessed datasets; and while monitoring the access history:
  computing probabilities of access, by the one or more applications, of the datasets stored on the storage system by at least comparing metadata associated to the datasets stored on the storage system to the identified metadata associated to the accessed datasets as identified in the monitored access history, wherein the comparing of the metadata comprises weighting the identified metadata associated to the accessed datasets as identified in the monitored access history, wherein the identified metadata associated to more recently accessed datasets are assigned a higher weight than the identified metadata associated to less recently accessed datasets, where the comparing comprises use of the metadata associated to the datasets and not the datasets themselves;
  wherein the comparing comprises sampling metadata associated to datasets stored on the storage system, together with metadata associated to said accessed datasets in the monitored access history and occurrences of said accessed datasets in the monitored access history, to obtain samples, and wherein said probabilities of access are computed based on the samples obtained;
  wherein the comparing further comprises: estimating conditional probabilities $P(L=1|X=x, Y=y) \equiv p(1|x, y)$ of occurrences, in the access history, of metadata associated to datasets stored on the storage system, given metadata y associated to datasets stored on the storage system, and metadata x associated to said accessed datasets in the monitored access history, as sampled, and wherein said probabilities of access are computed based on the probabilities of occurrences estimated;
  reducing a dimensionality of arrays {x, y} involved in said probabilities of occurrences $p(1|x, y)$, so as for the latter to be computed as $p(1|z)$, wherein each value z corresponds to pairs of value; and
  based on the computed probabilities of access, selecting and moving one or more of the datasets to be moved across said tiers.

13. The multi-tiered storage system according to claim 12, wherein said conditional probabilities of occurrences are estimated according to Bayes law.

14. A computer program product for managing digital datasets stored on a multi-tiered storage system that comprises several tiers of storage, the datasets likely to be accessed by one or more applications interacting with the storage system, the computer program product comprising a non-transitory computer readable storage medium having program instructions embodied therewith, the program instructions being executable by one or more processors to cause the storage system to:
  monitor an access history of the datasets accessed by the one or more applications, where the monitoring comprises identifying metadata associated to the accessed datasets; and
  while monitoring the access history:
    compute probabilities of access, by the one or more applications, of the datasets stored on the storage system by at least comparing metadata associated to the datasets stored on the storage system to the identified metadata associated to the accessed datasets as identified in the monitored access history, wherein the comparing of the metadata comprises weighting the identified metadata associated to the accessed datasets as identified in the monitored access history, wherein the identified metadata associated to more recently accessed datasets are assigned a higher weight than the identified metadata associated to less recently accessed datasets, where the comparing comprises use of the metadata associated to the datasets and not the datasets themselves;
    wherein the comparing comprises sampling metadata associated to datasets stored on the storage system, together with metadata associated to said accessed datasets in the monitored access history and occurrences of said accessed datasets in the monitored access history, to obtain samples, and wherein said probabilities of access are computed based on the samples obtained;
    wherein the comparing further comprises: estimating conditional probabilities $P(L=1|X=x, Y=y) \equiv p(1|x, y)$ of occurrences, in the access history, of metadata associated to datasets stored on the storage system, given metadata y associated to datasets stored on the storage system, and metadata x associated to said accessed datasets in the monitored access history, as sampled, and wherein said probabilities of access are computed based on the probabilities of occurrences estimated;
    reduce a dimensionality of arrays {x, y} involved in said probabilities of occurrences $p(1|x, y)$, so as for the latter to be computed as $p(1|z)$, wherein each value z corresponds to pairs of value; and
    based on the computed probabilities of access, selecting and moving one or more of the datasets to be moved across said tiers.

* * * * *